United States Patent [19]
Uota et al.

[11] Patent Number: 5,202,813
[45] Date of Patent: Apr. 13, 1993

[54] DRIVER DEVICE FOR A DUTY SOLENOID VALVE

[75] Inventors: Kosaku Uota; Munehiko Mimura, both of Himeji, Japan

[73] Assignee: Mitsubishi Denki K.K., Tokyo, Japan

[21] Appl. No.: 616,980

[22] Filed: Nov. 21, 1990

[30] Foreign Application Priority Data

Nov. 24, 1989 [JP] Japan .................. 1-305914

[51] Int. Cl.⁵ .................. H01H 47/18; G05F 1/56
[52] U.S. Cl. .................. 361/154; 323/222; 323/284; 364/510; 251/129.05
[58] Field of Search .......... 251/129.05; 361/152, 361/154, 196, 199, 205, 194, 171, 172, 144, 153; 323/222, 282, 283, 284, 349, 351, 288; 364/431.05, 431.07, 483, 510, 550, 571.01, 571.03; 324/114

[56] References Cited

U.S. PATENT DOCUMENTS

| | | | |
|---|---|---|---|
| 4,745,514 | 5/1988 | Takeshima et al. | 361/154 |
| 4,770,178 | 9/1988 | Sausner et al. | 361/152 |
| 4,825,333 | 4/1989 | Clive et al. | 361/154 |
| 4,854,920 | 8/1989 | Mimura | 474/28 |
| 4,953,056 | 8/1990 | Yakuwa et al. | 361/154 |
| 4,978,865 | 12/1990 | Hartmann et al. | 361/152 |

FOREIGN PATENT DOCUMENTS

| | | |
|---|---|---|
| 0080795 | 6/1983 | European Pat. Off. |
| 2827103 | 1/1979 | Fed. Rep. of Germany |
| 2827103 | 1/1979 | Fed. Rep. of Germany |
| 2813752 | 2/1979 | Fed. Rep. of Germany |
| 01765 | 3/1987 | World Int. Prop. O. |

Primary Examiner—A. D. Pellinen
Assistant Examiner—Richard Elms
Attorney, Agent, or Firm—Sughrue, Mion, Zinn, Macpeak & Seas

[57] ABSTRACT

A driver device for a duty solenoid valve comprises a pair of transistors 27 and 31 for controlling the excitation current level flowing through the solenoid 17 of the valve, and a transistor 45 for turning on and off the excitation current. The excitation current level is detected via an integrator 63 and A/D converter 61 by a microcomputer 62. In response to the detected excitation current level, the microcomputer 62 generates a first pulse signal (PWM signal) via OUT3 to control the level of the excitation current to a target level. Further, the microcomputer 62 outputs a second pulse signal via the OUT4 to the transistor 45 to control the duty ratio of the solenoid 17.

4 Claims, 15 Drawing Sheets

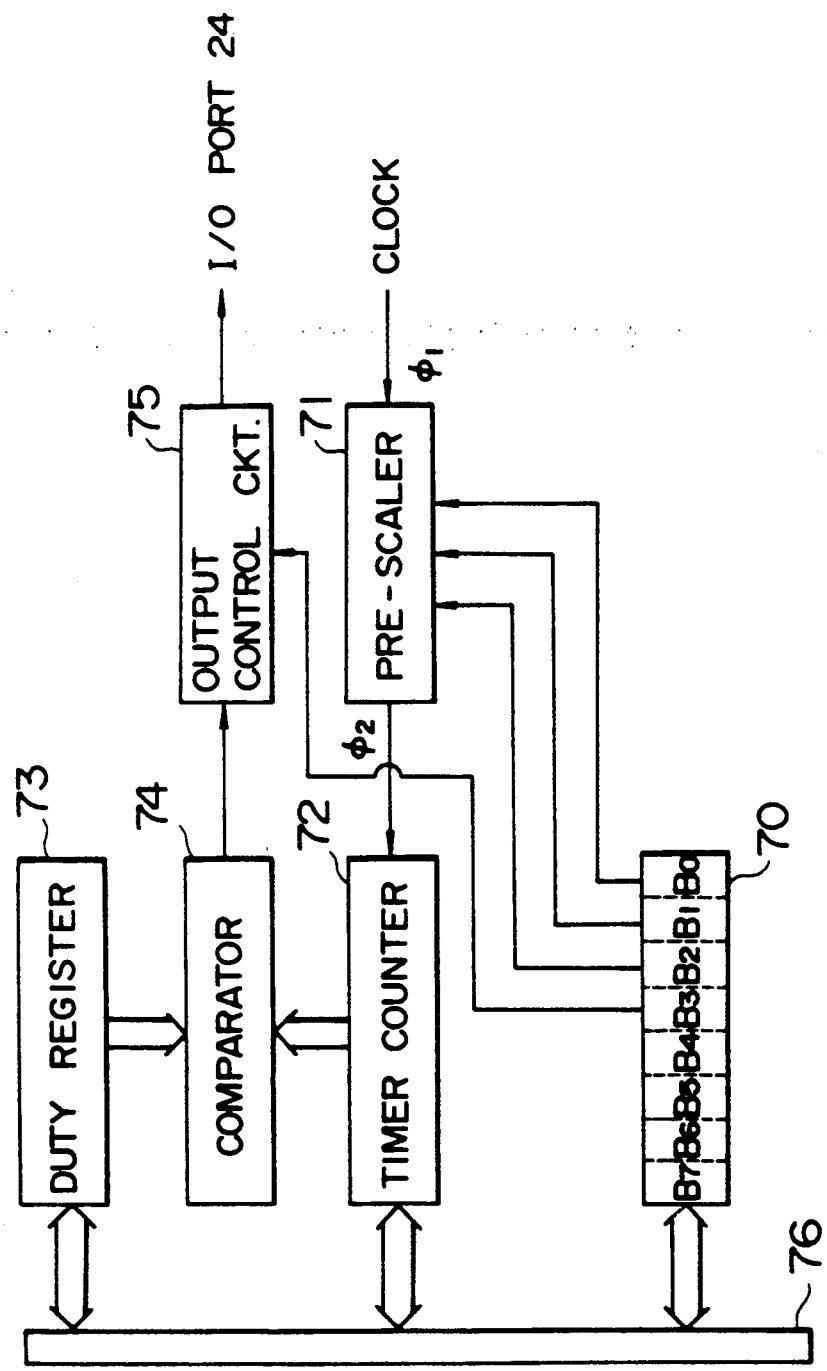

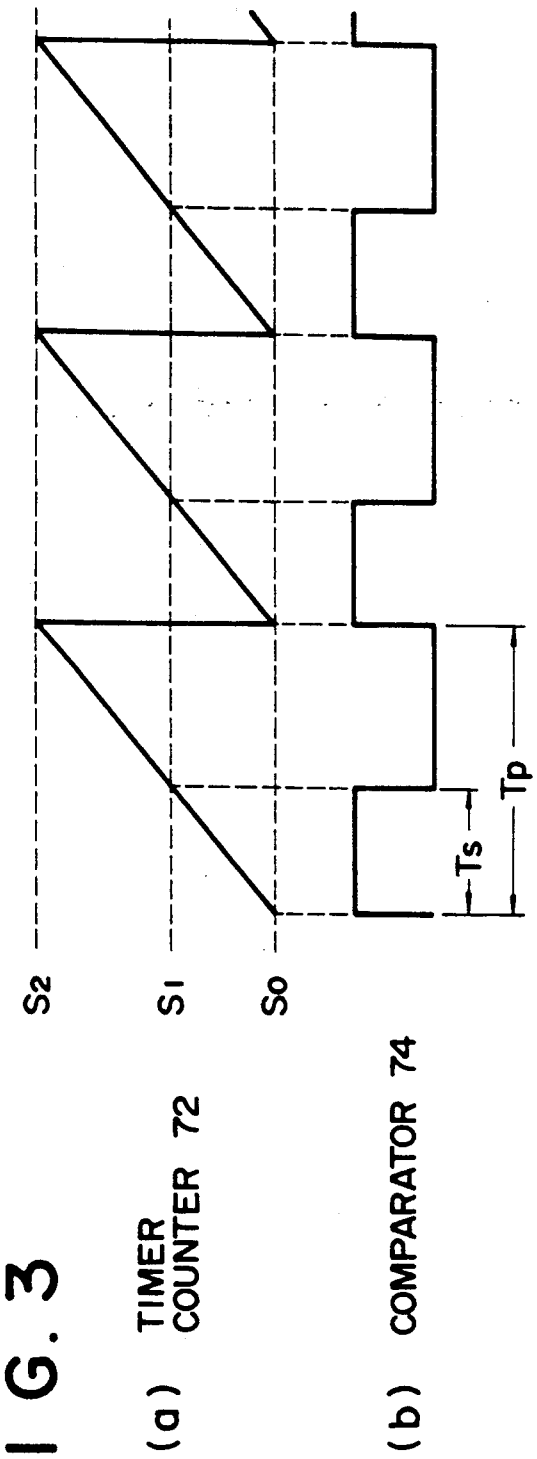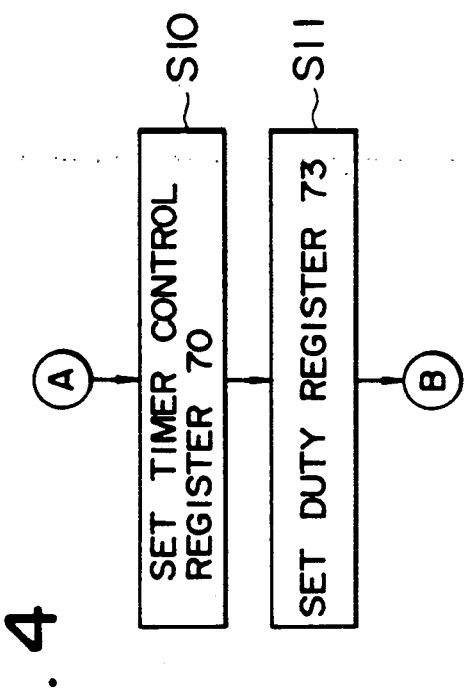

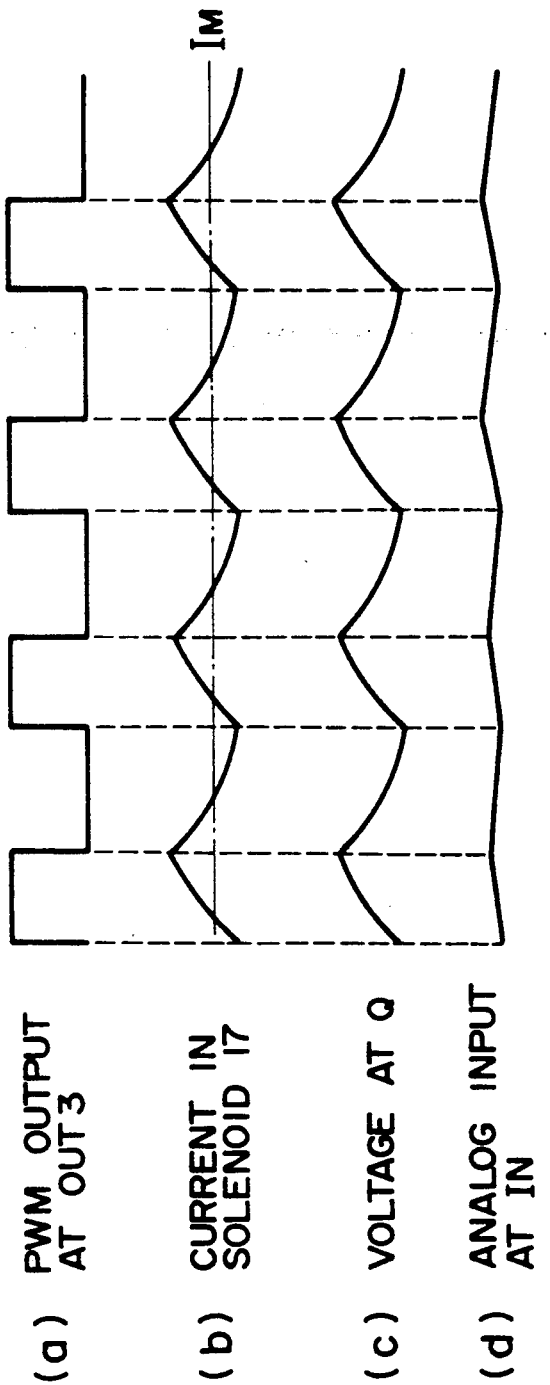

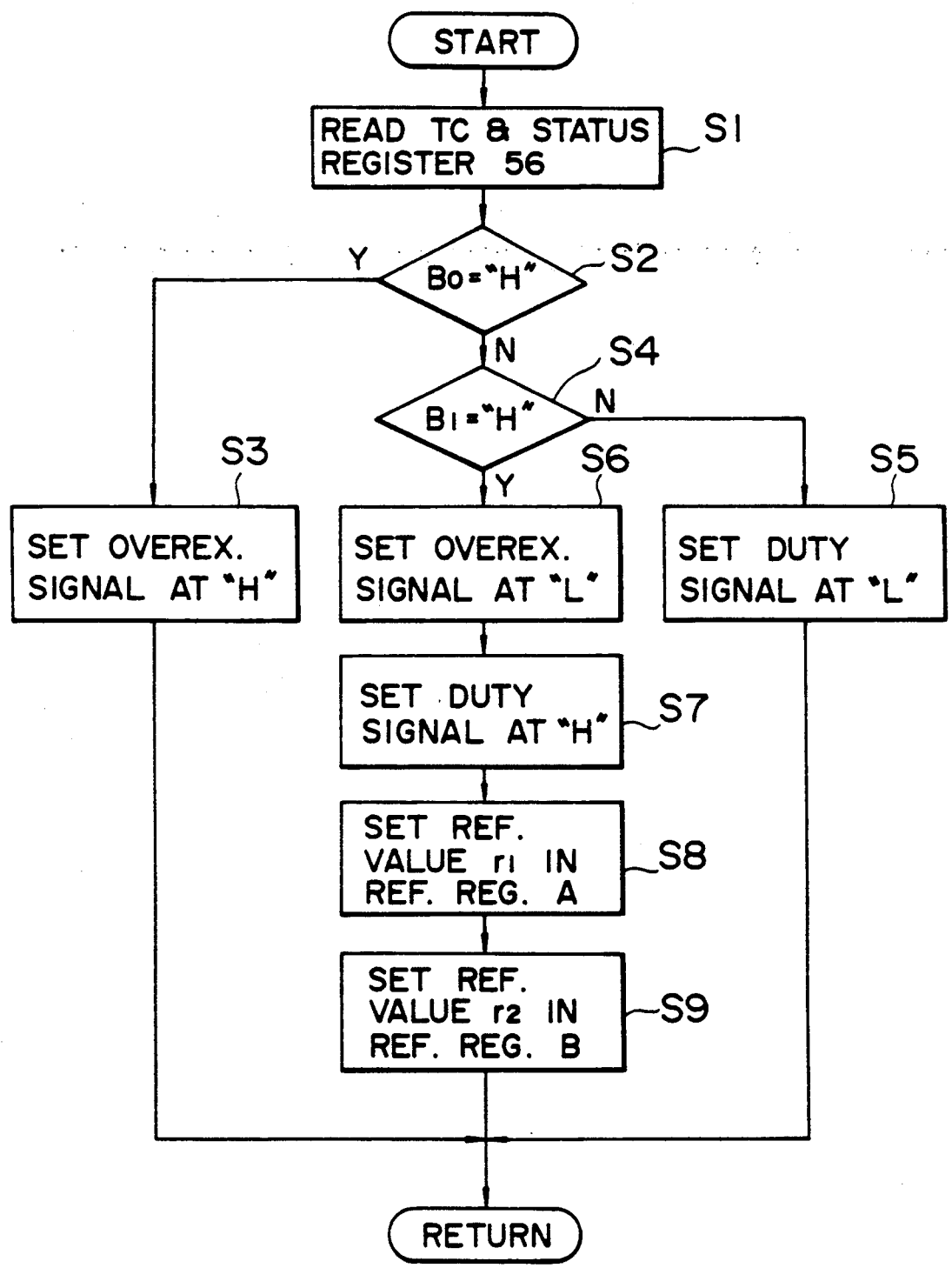

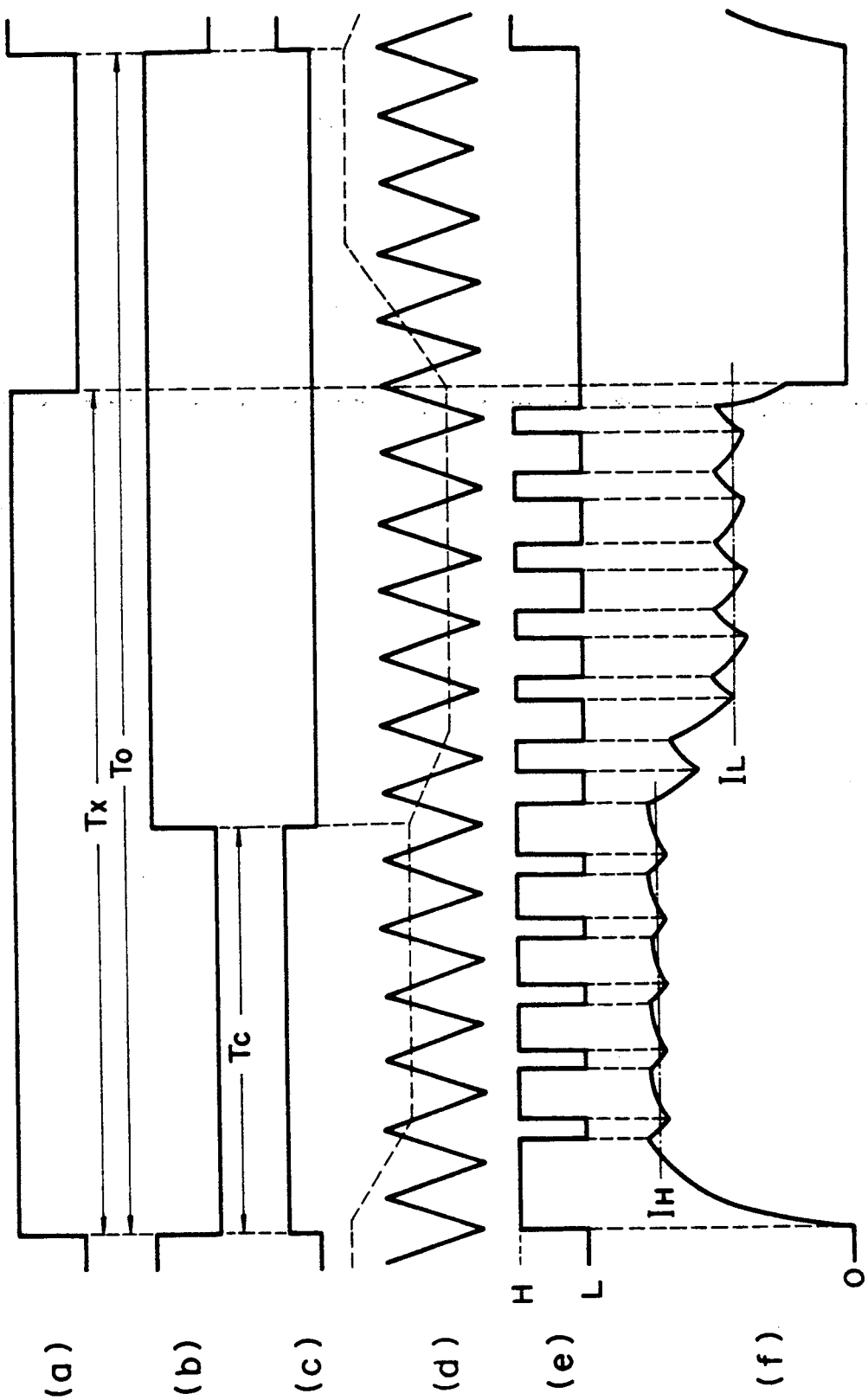

DRIVER DEVICE FOR A DUTY SOLENOID VALVE

BACKGROUND OF THE INVENTION

This invention relates to driver devices for controlling a duty ratio control solenoid type valve (referred to as a duty solenoid valve) in order to adjust the flow rate or pressure of a fluid.

FIG. 11 shows a typical organization of a duty solenoid valve for controlling oil pressure. The duty solenoid valve includes an input port 10 to which a supply pressure Pa is applied; a drain port 11 usually having a pressure equal to atmospheric pressure Pex; and an output port 12, having a control pressure Pc which is determined by the duty ratio of the valve, i.e., the ratio of the time lengths at which passage is provided between the output port 12 and the input port 10 and when passage is provided between the output port 12 and the drain port 11, respectively. When the solenoid 17 is not energized, the ball 14 is urged on the valve seat Sc by the spring 16, such that passage is provided between the output port 12 and the drain 11, thereby lowering the control pressure Pc toward the drain pressure Pex. When, on the other hand, the solenoid 17 is energized, the plunger 13 is attracted by the solenoid 17 against the urging force of the spring 16 and the ball 14 is retracted to the valve seat So, such that passage is provided between the output port 12 and the input 10, thereby raising the control pressure Pc toward the supply pressure Pa. Thus, the control or output pressure Pc may be adjusted to a target level by controlling the duty ratio or the energization time ratio of the solenoid 17.

FIG. 12 shows the relation between the duty ratio of the solenoid 17 and the control pressure Pc. When the duty ratio is in the neighborhood of 0%, the length of time during which the input port 10 and the output port 12 are coupled to each other is so short that the control pressure Pc is equal to the drain pressure Pex. When, on the other hand, the duty ratio is in the neighborhood of 100%, the length of time during which the output port 12 and the drain port 11 are coupled to each other is so short that the control pressure Pc is equal to the supply pressure Pa. However, except for these non-sensitive duty ratio regions near 0% and 100%, the control pressure Pc is substantially proportional to the duty ratio.

FIG. 13 shows the waveform of the excitation current supplied to the solenoid 17. The duty ratio is equal to (Tx/To)×100%, since the solenoid 17 is energized for the time Tx during one cycle period To. An overexcitation current $I_H$ is supplied for a short period of time Tc at the head of energization time Tx, such that the ball 14 is quickly moved from the seat Sc to the seat So. Thereafter, the excitation current is reduced to a lower hold level $I_L$. The overexcitation period Tc is selected somewhat longer than the time required to complete the movement of the ball 14 from the seat Sc to the seat So.

In the case of a voltage control type driver system where the current level is raised to the overexcitation level $I_H$ by increasing the voltage applied across the solenoid 17 and an automotive battery is utilized as the voltage source, the excitation current level may vary greatly due to the variation of the supply voltage or the thermal variation of the resistance of the solenoid 17. Further, in the case of such a system a resistance is connected serially with the solenoid 17 to lower the excitation current to the low level $I_L$. This serial insertion of a resistance results in a substantial loss of power. Thus, the excitation current level is usually controlled to predetermined constant overexcitation level $I_H$ and hold level $I_L$ by means of an elecronic control system.

FIG. 14 shows a conventional control driver circuit for the solenoid 17. A microcomputer 20, comprising a CPU 21, ROM 22, RAM 23, I/O port 24, timer 25, and a data bus 26, determines the duty ratio (Tx/To) of the solenoid 17 as required by the target control pressure Pc, in accordance with the relation between the duty ratio and the control pressure Pc shown in FIG. 12, and outputs a corresponding duty pulse signal from the output terminal OUT1. The duty pulse signal from OUT1 is held at a high level H during the excitation time Tx. Further, an overexcitation signal, held at a low level L during the overexcitation time Tc, is outputted from the terminal OUT2.

The duty pulse signal and the overexcitation signal are generated by means of the timer 25 of the microcomputer 20. FIG. 15 shows the detailed organization of the timer 25, while FIG. 16 is a timing chart for describing the operations of the timer 25. A pre-scaler 50 divides the clock frequency of the microcomputer 20 by 1/N, and a 16-bit free-running counter 51 counts the number of clock pulses from the pre-scaler 50. The demultiplication factor 1/N can be set by the bits B3, B4, B5 of the timer-counter and status register 56 by means of a program. Thus, the content of the 16-bit free-running counter 51 changes as shown in FIG. 16(a), overflowing and reset at the end of each period To at r3 or FFFFH in hexadecimal. The 16-bit reference registors A and B (52 and 54) store reference values r1 and r2 (see FIG. 16(a)) corresponding to Tc and Tx, respectively. Thus, the comparator A 53 sets the comparison bit Bo of the counter 56 when the content of the free-running counter 51 reaches r1; on the other hand, the comparator B 55 sets the comparison bit B2 when the content of the counter 51 reaches r2. Further, a timer overflow flag B1 is set each time when the free-running counter 51 overflows at r3. An interrupt is generated by the OR gate 57 when one of the bits B0 through B2 is set.

The interrupt generated by the OR gate 57 starts an interrupt routine within the microcomputer 20, shown in FIG. 17. The steps S3 and S5 corresponds to the time points at which the content of the free-running counter 51 reaches r1 and r2, respectively; when the content of the free-running counter reaches r3, the steps S6 through S9 are executed. Thus, there are generated: an overexcitation signal having the waveform as shown in FIG. 16(b) (note that the low level L corresponds to the supply of the overexcitation signal), and the duty pulse signal having the waveform of FIG. 16(c) (note that the high level H corresponds to the supply the excitation current). The reference values r1 and r2 are set at steps S8 and S9 such that the duty ratio Tx/To and the overexcitation time Tc are adjusted properly in accordance with the target control pressure Pc, etc.

FIG. 18 shows the waveforms occurring in the circuit of FIG. 14. The waveforms at FIG. 18(a) and (b) represent the duty pulse signal and the overexcitation signal, respectively, outputted from OUT1 and OUT2 of the microcomputer; the waveform at (c) represents the non-inverting input signal to the operational amplifier 36 (voltage at point P); the solid and the dotted waveforms at (d) represent the inverting and non-inverting input to the comparator 38, respectively; the waveform at (e) represents the output of the AND gate 39; and the waveform at (f) represents the excitation current flowing through the solenoid 17.

The transistor 45, coupled serially with the solenoid 17, is turned on and off in response to the high level H and the low level L of the duty pulse signal from OUT1, thereby turning on and off the excitation current flowing through the solenoid 17. The Zener diode 46 suppresses the surge voltage that is developed when the transistor 45 is turned off. During the overexcitation time Tc, the level of the overexcitation signal from OUT2 is at the low level L, such that the transistor 43 is turned off and the voltage at point P is at a first (higher) predetermined level as determined by the voltage divider consisting of the resistors 40 and 41; during the rest of the excitation time (Tx−Tc) when the overexcitation signal is at the high level H (i.e., is negated), the transistor 43 is turned on, such that the voltage at the point P is at a second (lower) predetermined level as determined by the ratio of the resistors 40 and 42. The error amplifier 33 amplifies the error or difference between the voltage at point P and the voltage at Q (corresponding to the excitation current through solenoid 17). The output of the error amplifier 33 becomes greater when the voltage at Q becomes smaller. Thus, the comparator 38 outputs a PWM (pulse-width modulation) output as shown in FIG. 18(e) and supplies it to the the AND gate 39. The transistors 31 and 27 are turned on and off in response to the output of the AND gate 39. Thus, the excitation current through the solenoid 17 is controlled to the predetermined levels $I_H$ and $I_L$ (see FIG. 18(f)) during the periods Tc and (Tx−Tc), respectively, as determined by the two predetermined voltage levels at point P. When the excitation signal from OUT1 falls to the low level L, the transistor 45 is turned off and the excitation current is thereby interrupted.

The above conventional driver device for a duty solenoid valve has the following disadvantages. Namely, the driver comprises, for controlling the excitation current to a predetermined level, an error amplifier 33, a triangular waveform generator 37, a voltage comparator 38, and an AND gate 39; further, for switching the excitation current level between two predetermined high and low levels $I_H$ and $I_L$, the driver device includes a transistor 43 and resistors 40 through 42 and 44. Thus, the circuit is complicated in organization and large in size. Further, the failures within the circuit, such as the disconnection of the solenoid 17 or the short circuit of the transistor 27, cannot readily be detected.

SUMMARY OF THE INVENTION

It is therefore an object of the present invention to provide a driver device for a duty solenoid valve which is simple in circuit organization and which is capable of readily detecting the failures within the circuit.

The above object is accomplished in accordance with the principle of this invention by a driver device for a duty solenoid valve which includes: a first driver means for controlling a current level of an excitation current through the solenoid coil, in response to a duty ratio of a first pulse signal; a second driver means for turning on and off an excitation current flowing through the solenoid coil, in response to a second pulse signal having a substantially longer period than the first pulse signal; a current detector means for detecting a level of the excitation current flowing through the solenoid coil; a first pulse width modulation signal generating means for generating, in response to the level of the excitation current detected by the current detector means, the first pulse signal having a duty ratio corresponding to a target excitation current level; and a second pulse width modulation signal generating means for generating the second pulse signal having a duty ratio corresponding to a target fluid pressure or flow rate of the duty solenoid valve; wherein the first and second pulse width modulation signal generating means are comprised in a microcomputer.

Preferably, the current detector means includes: a frequency divider means for dividing a frequency of a clock pulse signal of said microcomputer; a timer counter, coupled to the frequency division means, for counting a number of pulses supplied from the frequency division means, the timer counter returning to zero after each overflow; a reference register for storing the reference value corresponding to the duty ratio of the first pulse signal; a comparator for comparing a content of the timer counter with that of the reference register, the comparator outputting a first and a second logical level accordingly as the content of the timer counter becomes smaller or greater than the reference value stored in the reference register, a timer control register for storing an output suppression flag bit, and bits for controlling a division factor of the frequency division means, wherein the suppression flag bit is set and cleared in response to a transition of a logical level of the second pulse signal generated by the second pulse width signal generating means; and an output control circuit means, coupled to the comparator, for outputting an output of the comparator as the first pulse signal, the output control circuit means suppressing the output of the comparator in response to the suppression flag bit stored in the timer control register.

BRIEF DESCRIPTION OF THE DRAWINGS

The novel features of this invention are set forth with particularity in the appended claims. The invention, together with further objects and advantages thereof, may best be understood from the detailed description of the preferred embodiments, taken in connection with the accompanying drawings, in which:

FIG. 2 is a block diagram showing the organization of the PWM timer of the microcomputer of FIG. 1;

FIG. 3 is a timing diagram showing the waveforms within the PWM timer of FIG. 2;

FIG. 4 is a flow chart showing the routine for modifying the operating state of the PWM timer of FIG. 2;

FIG. 5 is a timing diagram for the excitation current level control operation;

FIG. 17 is a flow chart showing the interrupt routine of the device of FIG. 14; and FIG. 18 is a timing diagram showing the waveforms generated within the device of FIG. 14.

In the drawings, like reference numerals represent like or corresponding parts.

DETAILED DESCRIPTION OF THE PREFERRED EMBODIMENTS

Figure 1:
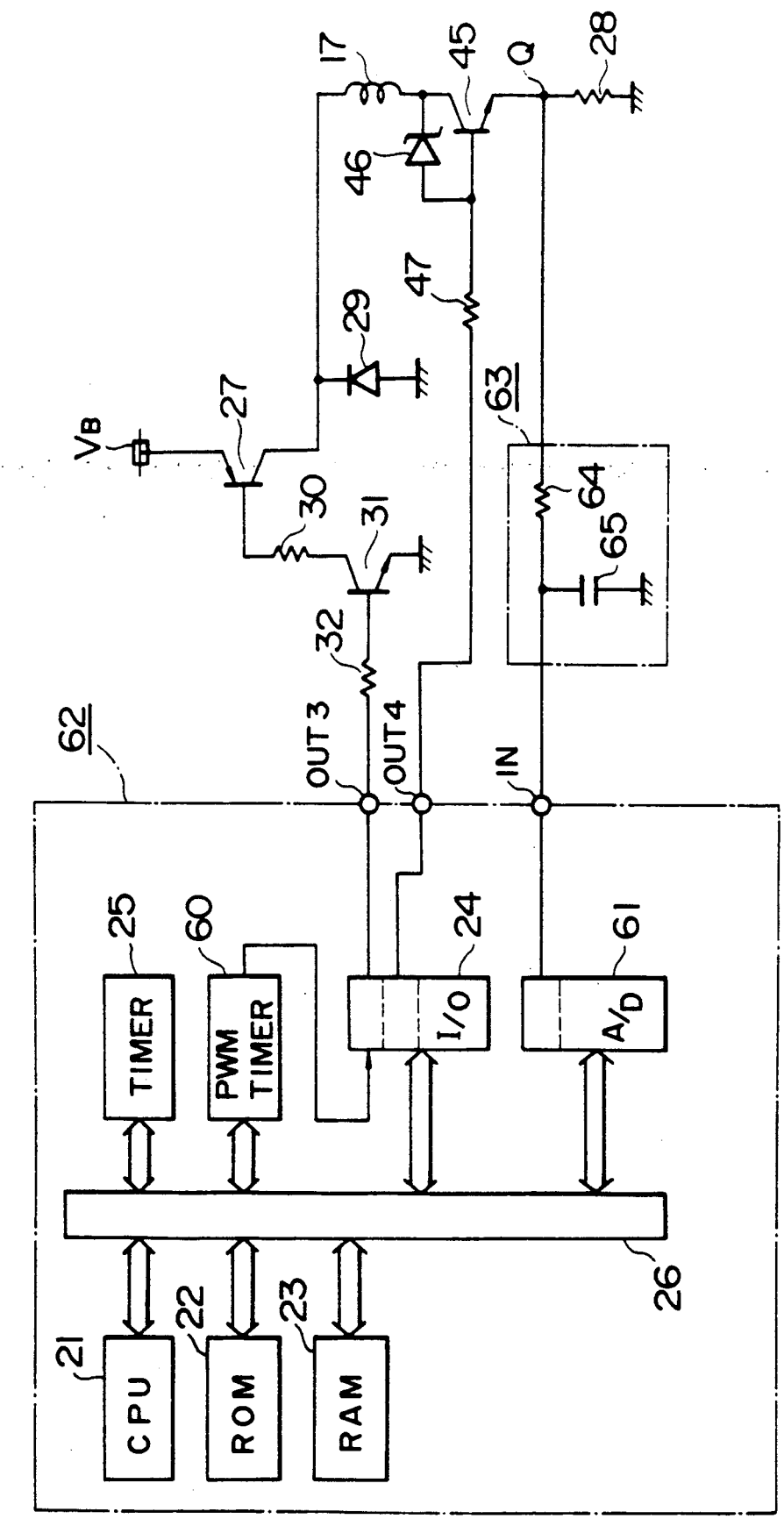
FIG. 1 is a circuit diagram showing the overall organization of a driver device for a duty solenoid valve according to this invention.

Referring now to the drawings, an embodiment of this invention is described, where the function of controlling the excitation current level to predetermined constant current levels and that of changing over the excitation current level are performed by the microcomputer, which also detects the excitation current through the solenoid such that failure of the driver circuit of the solenoid may be detected.

Figure 14:
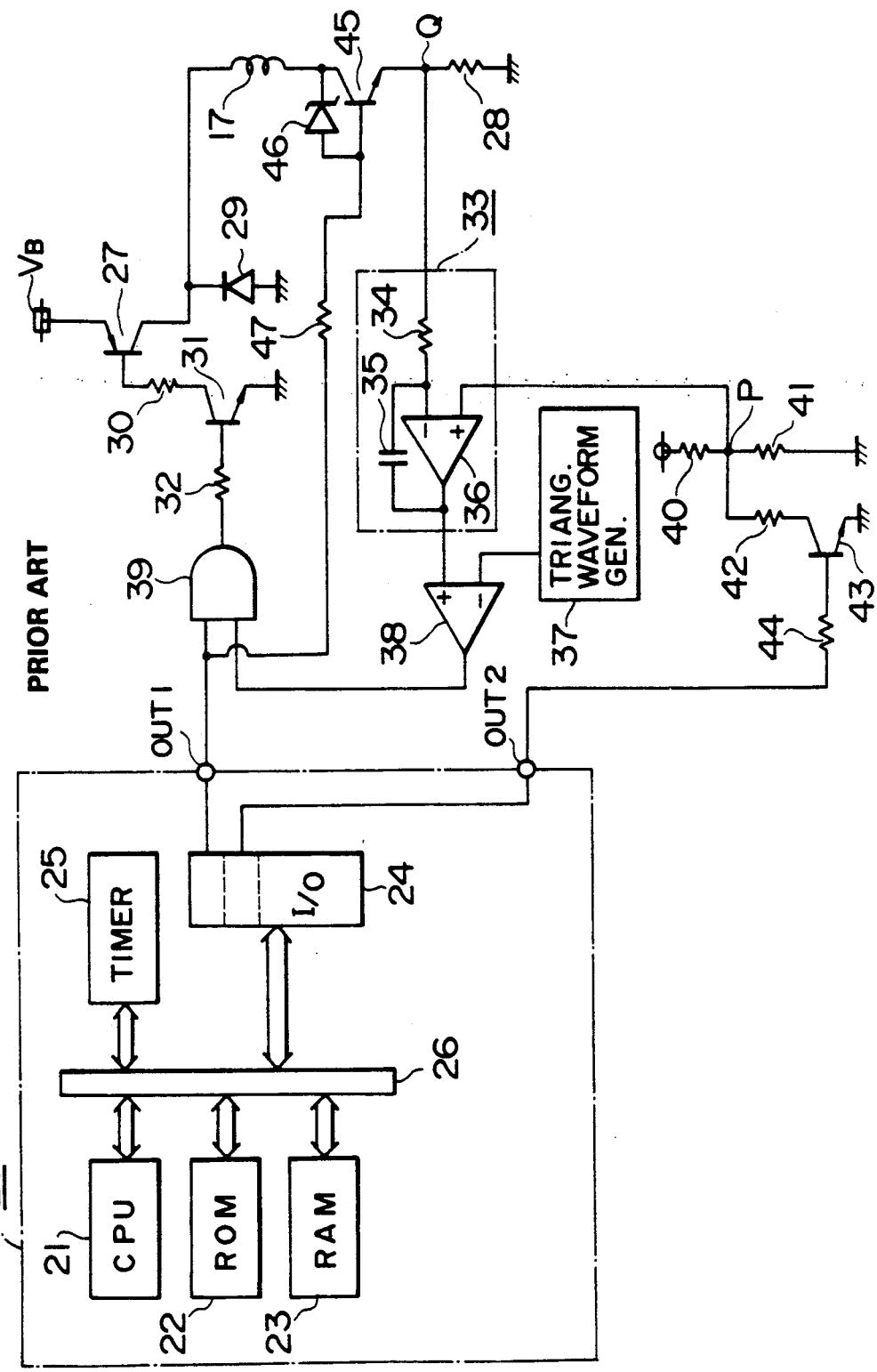
FIG. 14 is a circuit diagram showing a typical organization of a conventional driver device for a duty solenoid valve.

FIG. 1 shows the overall organization of the driver circuit of the solenoid according to an embodiment of this invention, wherein like reference numerals represent like or similar parts to those shown in FIG. 14. It is noted that the transistors 27 and 31, together with the resistors 30, 32, and a diode 29, comprise a first driver means for controlling the current level of the excitation current flowing through the solenoid 17, in response to an output signal from OUT3 of the microcomputer 62. Further, the transistors 45 and the zener diode 46 comprise a second driver means for turning on and off the excitation current through the solenoid 17 in response to an output signal from OUT4 of the microcomputer 62.

The microcomputer 62 comprises, in addition to a CPU 21, ROM 22, RAM 23, I/O port 24, timer 25, which correspond to those of FIG. 14, the following: a pulse width modulation timer (abbreviated to PWM timer hereinafter) 60 having an output connected to the I/O port 24; and an A/D (analog/digital) converter 61 for converting into a digital signal the analog voltage level corresponding to the excitation current through the solenoid 17. The voltage at point Q at the emitter of the transistor 45, which corresponds to the excitation current level through the solenoid 17, is coupled via an input terminal IN of the microcomputer 62 to the A/D converter 61 through an integrator circuit 63 consisting of a resistor 64 and a capacitor 65. As described in detail hereinbelow, an output terminal OUT3 of the microcomputer 62 outputs a PWM (pulse width modulated) signal corresponding to that of the AND gate 39 of FIG. 14; on the other hand, another output terminal OUT4 outputs a duty pulse signal corresponding to that outputted from OUT1 of FIG. 14. Thus, the method of operation of the first and second driver means as mentioned above is similar to those of the driver device of FIG. 14.

The method of operation of the microcomputer 62 is as follows.

Figure 15:
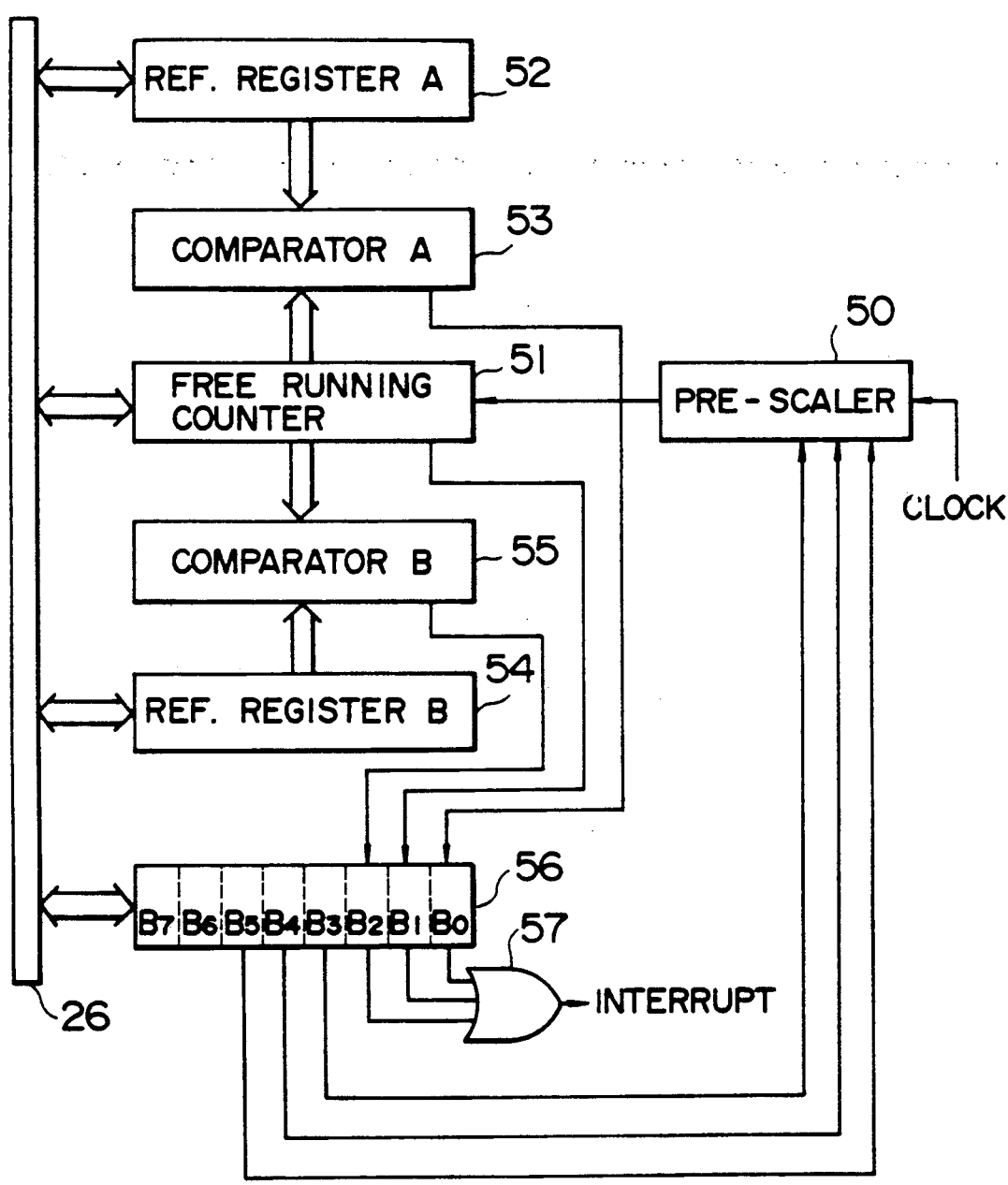
FIG. 15 shows the organization of a timer of the driver device of FIG. 1 or 14.
Figure 16:
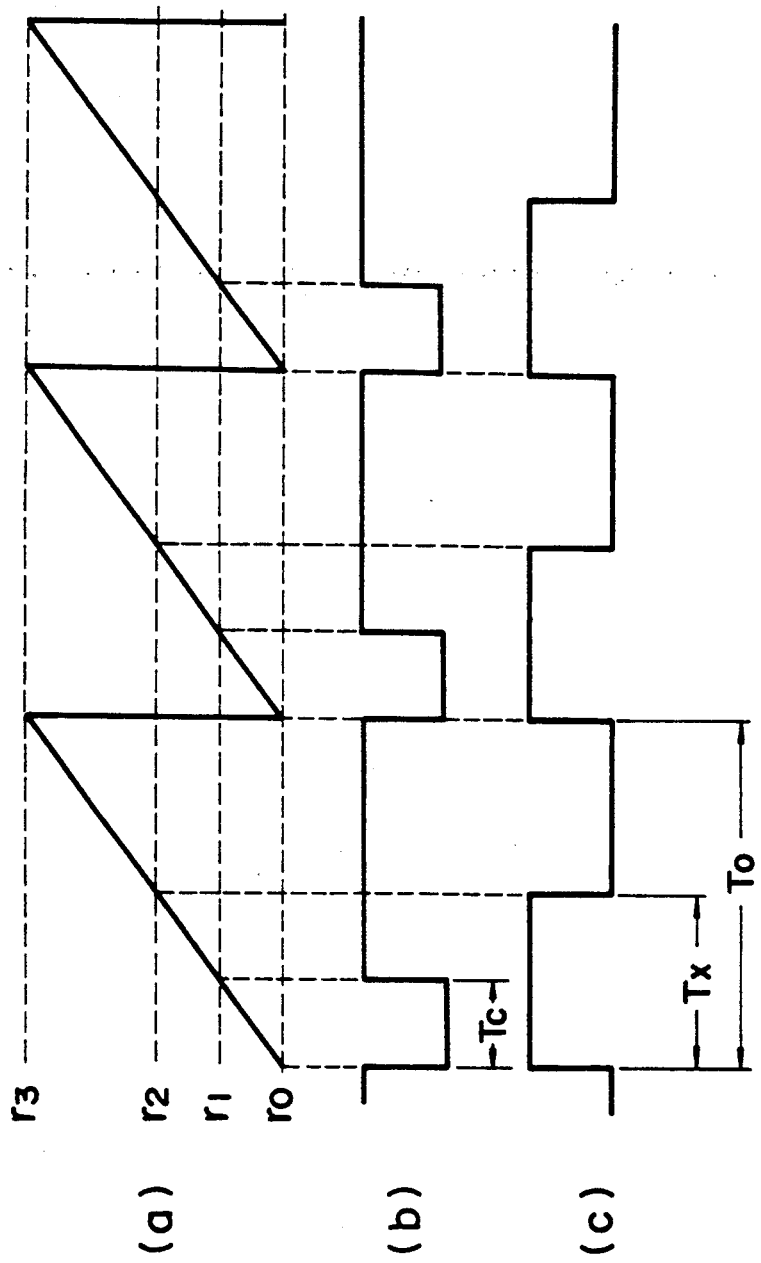
FIG. 16 is a timing diagram showing the waveforms within the timer of FIG. 15.

The timer 25 has an organization similar to that shown in FIG. 15 and the method of operation is also similar. It is noted in connection with the timer 25 that if the driving frequency of the solenoid 17 is set at about 50 Hz, for example, the one cycle period To in FIG. 16 is about 20 ms. More precisely, since the free running counter 51 is a 16 bit counter, the content FFFFH in hexadecimal notation (65535 in decimal) at the overflow must correspond to about 20 ms. Thus, the clock period from the pre-scaler 50 should be set at:

$$20 \text{ ms}/65535 \approx 0.3 \text{ } \mu s,$$

and thus the frequency thereof should be about 3.3 MHz. On the other hand, the clock input to the pre-scaler 50 has $\frac{1}{2}$ or $\frac{1}{4}$ of the frequency of a quartz oscillator of the microcomputer, which usually has an integral frequency value such as 4, 8, 12, 16, or 20 MHz. We assume that the frequency of the quartz oscillator is 12 MHz and that of the clock input to the pre-scaler 50 is 6 MHz. Then, in order to set the input clock frequency to the free-running counter 51 at an integral (that is at 3 MHz) near the desired frequency 3.3 MHz, the division factor of the pre-scaler 50 must be selected at $\frac{1}{2}$. Then, the input clock period to the free-running counter 51 is:

$$1/(3 \times 10^6 \text{ Hz}) \approx 0.33 \text{ } \mu s;$$

thus, under the above assumptions, the actual driving period To of the solenoid 17 is equal to about:

$$0.33 \text{ } \mu s \times 65535 \approx 21.6 \text{ ms}.$$

(As described above, the division factor of the pre-scaler 50 can be set by means of a program via the bits B3, B4, B5 in the timer control and status register 56 of FIG. 15.) The overflow of the free-running counter 51 takes place at r3 in FIG. 16, or FFFFH in hexadecimal, and the one cycle period To is equal to about 21.6 ms under the above assumption. The timer overflow bit B1 of the status register 56 is set at each overflow of the free-running counter 51. The compare flags B0 and B2 are set when the content of the counter 51 reaches the reference values r1 and r2, respectively, corresponding to the overexcitation period Tc and the excitation period Tx. An interrupt is generated by the OR gate 57 when one of the bits B0 through B2 are set.

Next, the method of operation of the PWM timer 60 is described by reference to FIG. 2, which shows the detailed organization of the PWM timer 60. FIG. 3 is a timing chart for explaining the operation of the PWM timer 60. An 8-bit timer control register 70 stores the control flags of the PWM timer 60. A frequency division means or pre-scaler 71 divides the frequency of the clock signal $\phi 1$ of the microcomputer by a division factor as designated by the three least significant bits B0 through B2 of the control register 70, and outputs the frequency clock $\phi 2$ to an 8-bit timer counter 72. The timer counter 72 counts up the number of the pulses of the clock $\phi 2$, overflowing at s2 or FFH in hexadecimal (255 in decimal). Thus, the content of the timer counter 72 varies as shown in FIG. 3(a). An 8-bit duty register 73 stores an 8-bit reference value s1 corresponding to the duty ratio Ts/Tp of the PWM output from OUT3. (More precisely, s1/s2 corresponds to Ts/Tp in FIG. 3.) A comparator 74 compares the content of the timer counter 72 with the reference value s1 stored in the duty register 73, and outputs a high level H when the content of timer counter 72 is smaller than the reference value, a low level L is output when the former is equal to or greater than the latter. Thus, the output of the comparator 74 is a pulse signal as shown at FIG. 3(b). The bit B3 in the timer control register 70 represents the output permission/suppression flag. A permission flag (e.g., B3=1) is set during the excitation time Tx, while a suppression flag (e.g., b3=0) is set during the rest of the driving cycle period To of the solenoid 17, as described in detail below. In response to the permission/suppression flag bit B3 in the register 70, the output control circuit 75 determines whether or not to output the PWM signal of the comparator 74 to the I/O port 24.

As shown in FIG. 3(a), the content of the timer counter 72 increases from s0=0, overflows at s2=255 (FFH in hexadecimal), and returns again to s0, to repeat the same cycle. The period of the cycle Tp is equal to the overflow time of the timer counter 72, which is equal to $(1/\phi 2)\times 256$. Assuming that the PWM signal from OUT3 has a period of about 1 ms (or a frequency of 1 kHz), the clock frequency $\phi 2$ is equal to about 0.25 MHz. The clock frequency $\phi 1$ is usually ½ or ¼ of the frequency of the quartz oscillator (not shown) of the microcomputer 62. Assuming that $\phi 1$ is equal to 1 MHz, it is necessary to set the division factor of the pre-scaler 70 at ¼. The division factor is set by a program by means of the bits B0, B1, B2. (Incidentally, all the control bits B0 through B7 are set by a program in the microcomputer 62.) Further, since s1/s2 corresponds to the duty ratio Ts/Tp of the PWM signal, an increase or decrease of one bit of s1 in the duty register 73 corresponds to:

$$(1/256)\times 100\% \approx 0.4\%$$

increase or decrease of the duty ratio of the PWM signal. Thus, under the assumption that the overflow period Tp of the timer counter 72 is equal to about 1 ms, the resolution of one bit in the duty register 73 is about 4 μs.

FIG. 4 shows a flowchart for operating the PWM timer 60. At step S10, the bits of the timer control register 70 are set. At the next step S11, the reference value s1 is set in the duty register 73. When the operating state of the PWM timer 60 is to be modified, e.g., when the duty ratio thereof is modified or the PWM output to the I/O port 24 thereof is suppressed, it is only necessary to execute the program as shown in FIG. 4. Thus, the hardware organization is such that when the operating state of the PWM timer 60 is not modified, the operation as shown in FIG. 3 is repeated automatically. Consequently, there is no time delay resulting from an interrupt routine as in the case of the timer 25.

Next, by reference to FIGS. 1 and 5, the method of control of the level of the excitation current through the solenoid 17 to predetermined constant levels is described. In FIG. 5, which shows the timing chart for the current control operation, waveform at (a) represents the PWM output from the output terminal OUT3; (b), the waveform of the excitation current through the solenoid 17; (c), the voltage waveform at point Q; and (d), the analog input waveform to the input terminal IN of the microcomputer. The PWM signal, as shown at FIG. 5(a) and generated by the PWM timer 60, is outputted via the I/O port 24 and from OUT3 of the microcomputer 62. In response thereto, the transistors 31 and 27 are turned on and off, to drive the excitation current level through the solenoid 17. The waveform of the current through the solenoid 17 is shown at FIG. 5(b). Since the voltage at point Q is proportional to the current through the solenoid 17, the waveform shown at FIG. 5(c) is similar to that of the excitation current shown at FIG. 5(b). The voltage at point Q is smoothed by the integrator 63 to be inputted to the terminal IN of the microcomputer 62. The waveform at the IN terminal, shown at FIG. 5(d), represents the time average $I_M$ of the excitation current through the solenoid 17. The A/D converter 61 converts into a digital value the average $I_M$ of the excitation current. Thus, the microcomputer can detect and measure the average $I_M$ of the excitation current through the solenoid 17 by reading the digital value of the A/D converter 61 by means of a program. The program of the microcomputer 62 compares the measured excitation current level with a target value, and increases the duty ratio (i.e., s1 corresponding to Ts in FIG. 3) of the PWM signal when the measured value is smaller than the target, and decreases the duty ratio when the measured value is greater than the target value, thereby controlling the measured current level be substantially equal to the target value.

Figure 6:
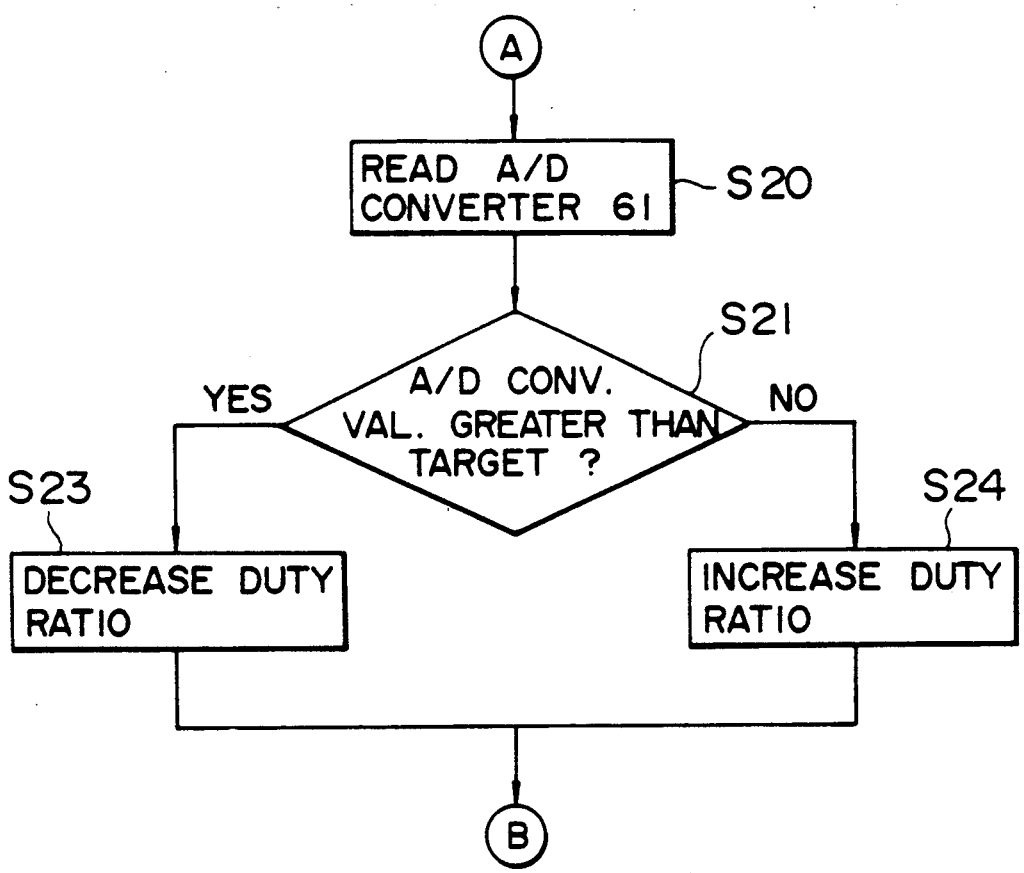
FIG. 6 is a flow chart showing the routine for controlling the excitation current level to a predetermined target level.

FIG. 6 shows a flowchart of the above current level control operation. At step S20, the A/D converted value of the digitized 61 is read in by the program. At step S21, it is judged whether or not the A/D converted value is greater than the target value. If it is greater, the duty ratio is decreased at step, S23. If, on the contrary, it is smaller, the duty ratio is increased at step S24.

Figure 7:
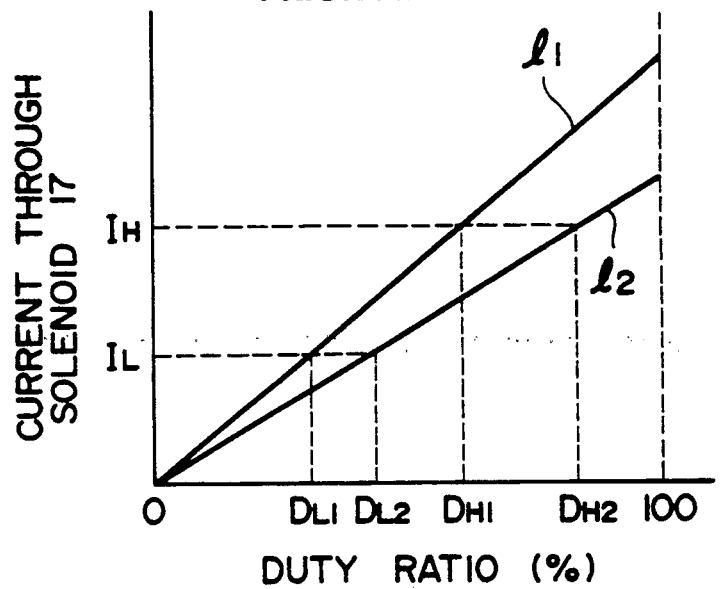
FIG. 7 shows the relations between the duty ratio of the PWM signal and excitation current level under different source voltage level conditions.
Figure 8:
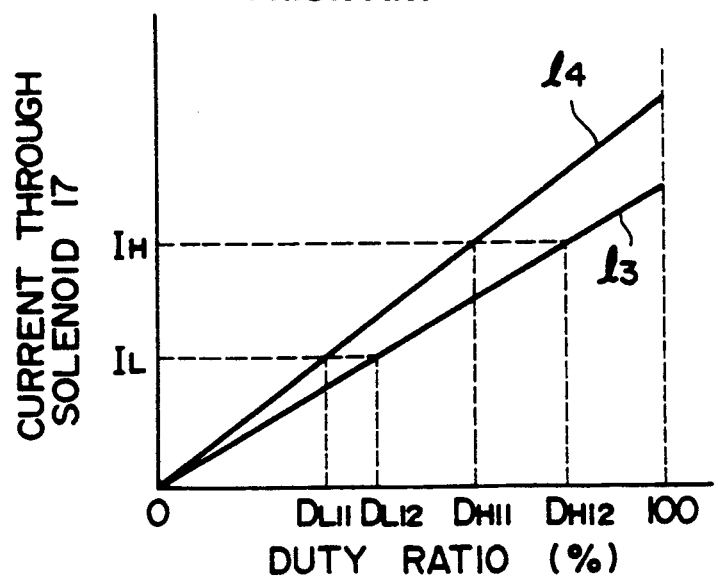
FIG. 8 shows the relations between the duty ratio of the PWM signal and excitation current level under different temperature conditions.

FIGS. 7 and 8 show the typical relationships between the duty ratio of the PWM signal and the excitation current level through the solenoid 17. FIG. 7 shows the two lines 11 and 12 which correspond to the cases where the source voltage for the solenoid 17 is at $V_H$ and $V_L$ (where $V_L<V_H$), respectively; FIG. 8, on the other hand, show the two lines 13 and 14 which correspond to the cases where the temperature of the solenoid 17 is at $T_H$ and $T_L$ (where $T_L<T_H$), respectively. Thus, the duty ratio of the PWM signal must be varied for the same target excitation current level $I_L$ or $I_H$, in accordance with the source voltage or the temperature of the solenoid 17. For example, in FIG. 7, the duty ratio corresponding to the current level $I_L$ is $D_L1$ and $D_L2$; that corresponding to $I_H$ is $D_H1$ and $D_H2$, depending on the source voltage. In FIG. 8, the duty ratio corresponding to the current level $I_L$ is $D_L 11$ or $D_L12$; that corresponding to $I_H$ is $D_H11$ and $D_H12$, depending on the temperature of the solenoid 17. With respect to these current varying factors, such as the source voltage or the temperature, the microcomputer program is capable of adjusting the current level through the solenoid 17 by controlling the duty ratio of the PWM signal in response to the difference between the measured and the target values of the current.

Figure 9:
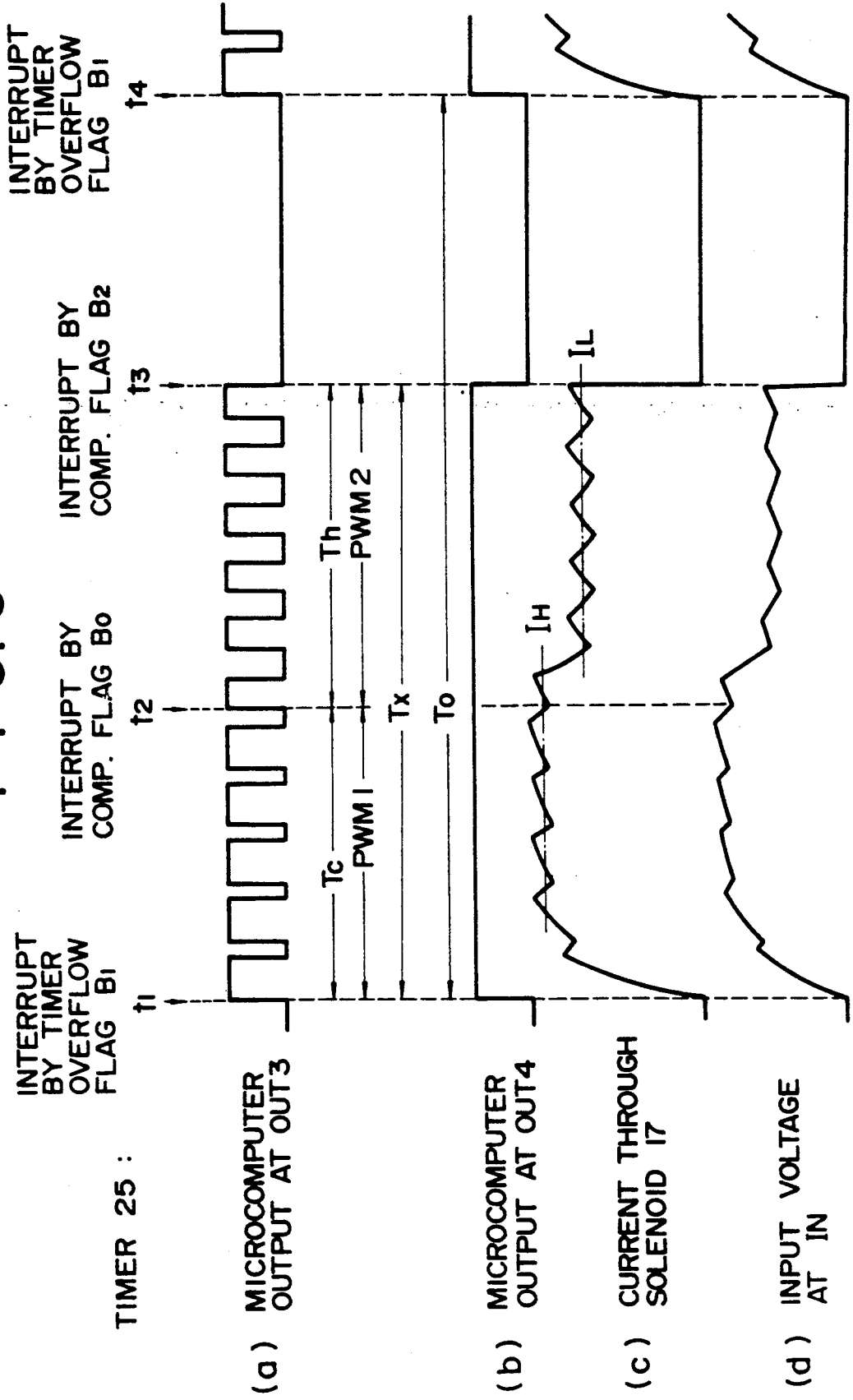
FIG. 9 is a timing diagram showing waveforms generated within the driver device of FIG. 1.

Referring next to FIGS. 1 and 9, the overall method of operation of the driver device is described. In FIG. 9, which shows the timing chart of the operations of the driver device, the waveform at (a) represents the PWM signal outputted from the output terminal OUT3 of the microcomputer 62; (b), the signal from OUT4 of the microcomputer 62; (c), the current through the solenoid 17; and (d), the input voltage waveform at the analog input terminal In of the microcomputer 62. On the other hand, at the top row is shown the interrupt signals output by the OR gate 57 of the timer 25 shown in FIG. 15. Thus, at time t1, an interrupt is generated by the timer overflow flag B1; at time t2, an interrupt is generated by the compare flag B0; at time t3, an interrupt is generated by the compare flag B2; and at time t4, an interrupt is generated by the timer overflow flag B0.

The timer 25 operates as described above. Thus, when an interrupt generated by the overflow flag B1 occurs at t1, the reference values r1 and r2 are stored in the reference registers A and B (52 and 54). Further, an output permission flag (bit B3) is set in the timer control register 70 of the PWM timer 60. Furthermore, a reference value or the duty ratio PWM1 for the overexcitation period Tc is set in the duty register 73 of the PWM timer 60. In addition, status data is set in the I/O port 24 to set OUT4 at a high level H.

Next, when an interrupt by the compare flag B0 occurs at t2, the reference value or duty ratio PWM2 corresponding to the hold period Th is set in the duty register 73. Further, since the overexcitation current level $I_H$ held during the overexcitation period Tc is smoothed by means of the integrator 63, the value $I_H$ is measured via the A/D converter 61. Further, the difference between the measured and the target values of $I_H$ is calculated and the duty ratio PWM1 for the next overexcitation period is adjusted for the next interrupt by the timer overflow flag B1 at t4 is stored in a memory.

Next, when an interrupt by the compare flag B2 occurs at time t3, the output suppression flag bit for suppressing the output of the PWM signal to the I/O port 24 is stored in the timer control register 70. Further, since the level of the hold current $I_L$ during the hold period Th is smoothed by the integrator 63 at this time point, the level of the hold current $I_L$ is measured via the A/D converter 61. The difference between the target and the measured current level is calculated, and the duty ratio PWM2 for the hold period is adjusted for the next interrupt by the compare flag B0 is stored in a memory. As described above, the levels of the overexcitation current $I_H$ and the hold current $I_L$ are adjusted in each driving period To of the solenoid 17. Furthermore, at time t3, data is stored in the I/O port 24 to set the output terminal OUT4 at the low level L.

The updating of the excitation time TX of the solenoid 17 is effected during the interrupt by the timer overflow flag B1 at which the target value of the control pressure Pc of the duty solenoid valve is modified. Further, since the frequency of the clock input into the pre-scaler 50 of the timer 25 of FIG. 15 and that of the clock input into the pre-scaler 71 of the PWM timer 60 of FIG. 2 are usually equal to each other, the driving period To of the solenoid 17 and the period Tp of the PWM signal are set accordingly.

Figure 10:
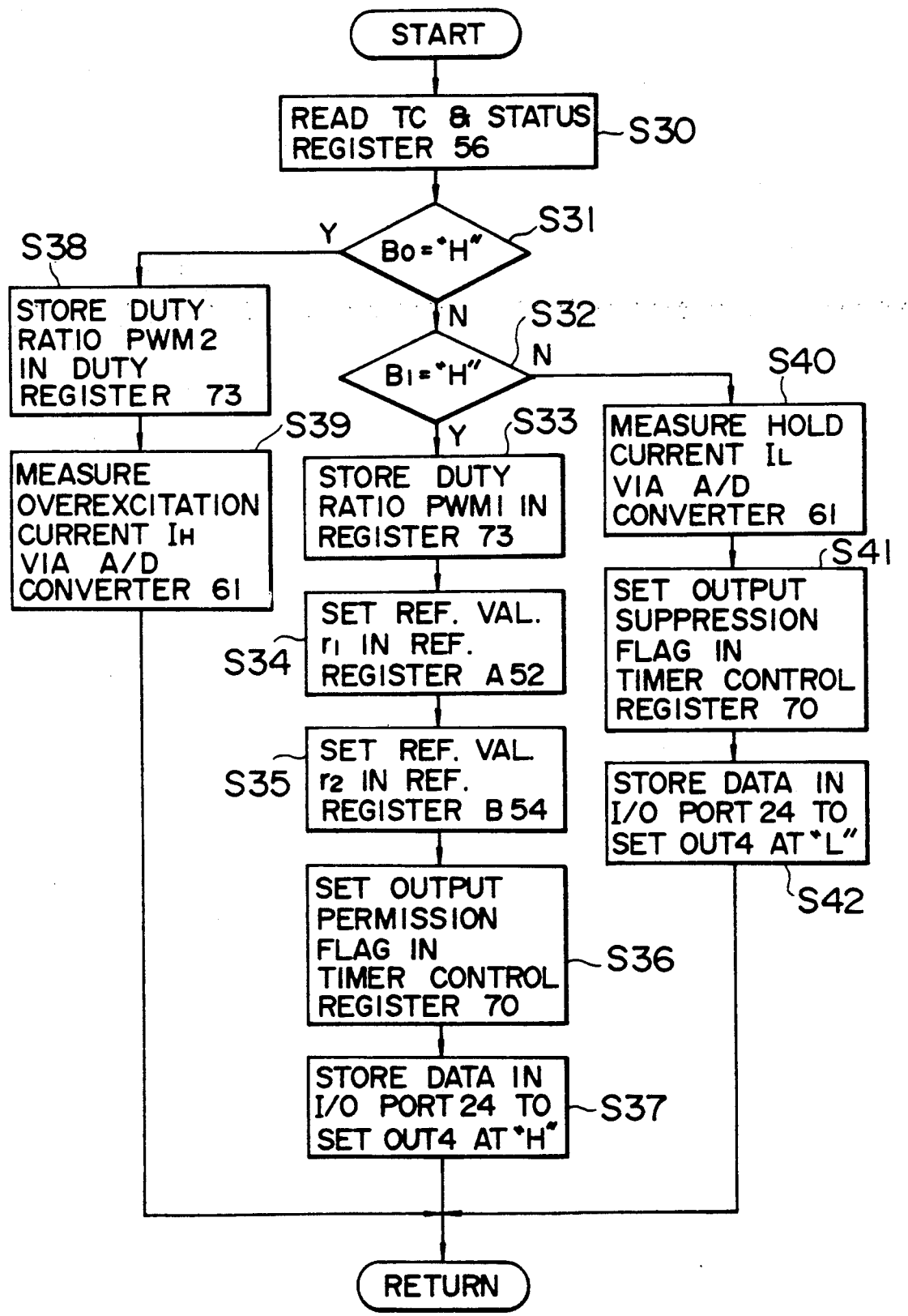
FIG. 10 is a flow chart showing the interrupt routine for generating the waveforms as shown in FIG. 9.
Figure 11:
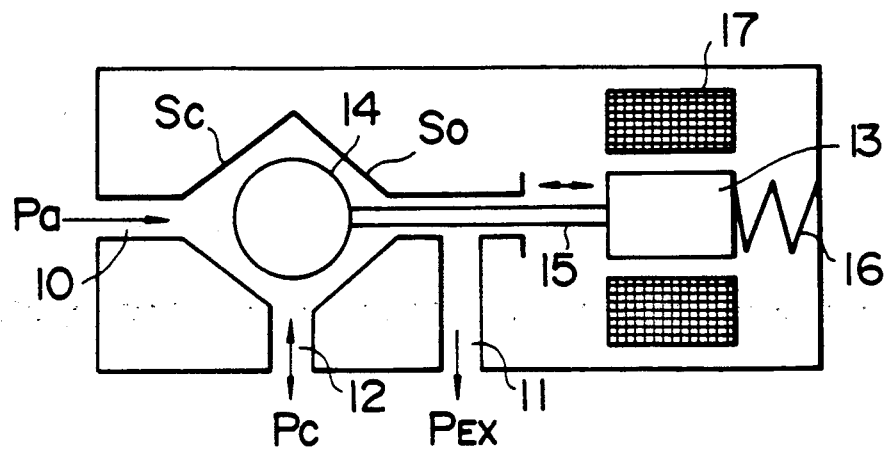
FIG. 11 is a schematic diagram showing a typical structure of a duty solenoid valve.
Figure 12:
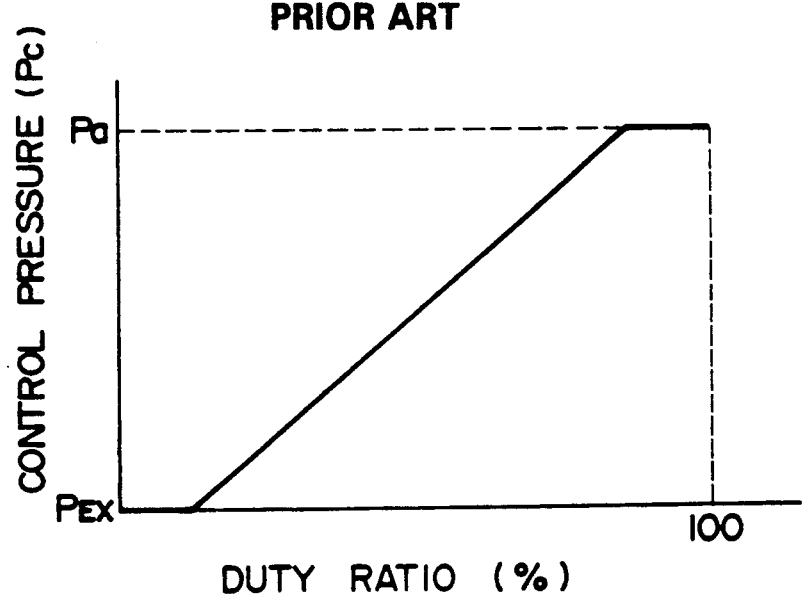
FIG. 12 shows the relation between the duty ratio of the solenoid and the control pressure of a duty solenoid valve.
Figure 13:
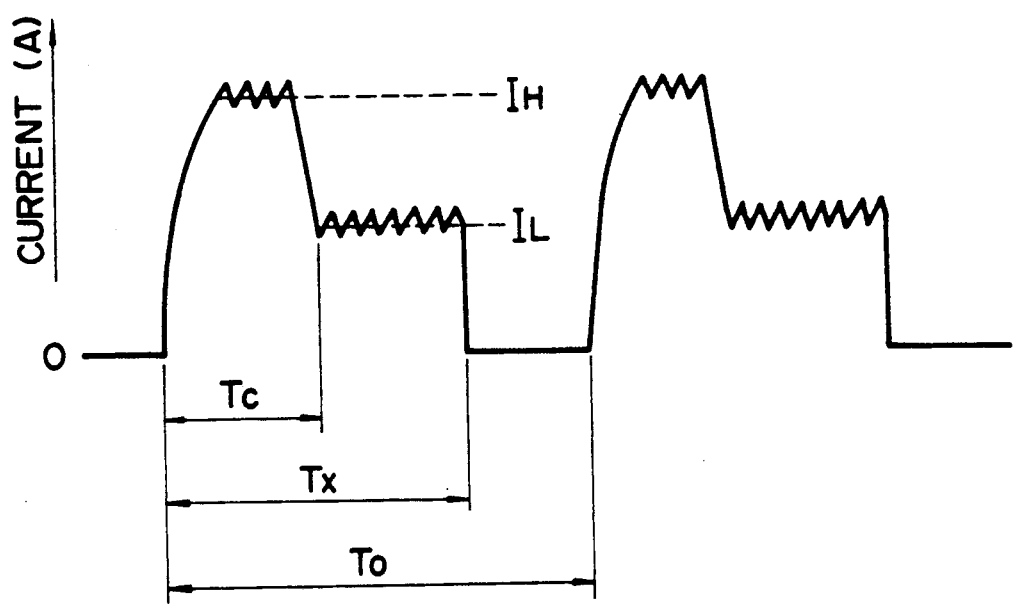
FIG. 13 shows a waveform of an excitation current flowing through the solenoid of a duty solenoid valve.

FIG. 10 shows a flowchart for the overall operations of the program as described above. At step S30, the content of the timer control and status register 56 is read in. At step S31, it is judged whether the bit B0 is H (or 1) or low. If the bit B0 is low L, the program proceeds to step S32, where it is judged whether the bit B1 is equal to H or not. If the bit B1 is judged to be equal to H at step S32, the program proceeds to step S33, where the duty ratio PWM1 for the overexcitation period is stored in register 73. Next, at step S34, the reference value r1 is set in the reference register A 52. At step S35, the reference value r2 is set in the reference register B 54. At step S36, the output permission flag for the output control circuit 75 is set in the timer control register 70. At step S37, data is set in the I/O port 24 to set the output terminal OUT4 at a high level H.

On the other hand, when it is judged at step S31 that the bit B0 is equal to H, the program proceeds to step S38, where the duty ratio PWM2 for the hold period is stored in the duty register 73. At the next step S39, the level of the overexcitation current $I_H$ is measured via the A/D converter 61.

When it is judged at step S32 that the bit B1 is not equal to H, the program proceeds to step S40, where the level of the hold current $I_L$ is measured via the A/D converter 61. Further, at the next step S41, the output suppression flag for the output control circuit 75 is stored in the timer control register 70. At the next step S42, data is stored in the I/O port 24 to set the output terminal OUT4 at the low level L.

The interrupt routine is terminated when one of the steps S37, S39, and S42 is executed.

With regard to the detection of failures, it is noted that the disconnection of the solenoid 17 results in a zero measurement level of the overexcitation current $I_H$ or the hold current $I_L$. Thus, the microcomputer can detect the disconnection of the solenoid 17. When, on the other hand, the transistor 27 is under short-circuit failure, the current level measured via the A/D converter 61 corresponds to the 100% duty ratio of the PWM signal. Thus, the microcomputer can also detect such failure.

What is claimed is:

1. A driver device for a duty solenoid valve which controls fluid pressure by adjusting a duty ratio of an excitation of a solenoid coil, said driver device comprising:
   first driver means for controlling a current level of an excitation current through said solenoid coil, in response to a duty ratio of a first pulse signal;
   second driver means for turning on and off an excitation current flowing through said solenoid coil, in response to a second pulse signal having a substantially longer period than said first pulse signal;
   current detector means for detecting a level of the excitation current flowing through said solenoid coil;
   first pulse width modulation signal generating means for generating, in response to the level of the excitation current detected by said current detector means, said first pulse signal having a duty ratio corresponding to a target excitation current level, said first pulse width modulation signal generating means including means for storing a reference value corresponding to the duty ratio of said first pulse signal and means for comparing said reference value to a value contained in a counter means wherein said first pulse signal is output based upon said comparison; and
   second pulse width modulation signal generating means for generating said second pulse signal having a duty ratio corresponding to a target fluid pressure of the duty solenoid valve;
   wherein said first and second pulse width modulation signal generating means are comprised in a microcomputer.

2. A driver device as claimed in claim 1, wherein said current detector means comprises:
   integrator circuit means for taking a time average of the detected excitation current level; and
   an A/D converter for converting a detected analog excitation current level into a corresponding digital signal.

3. A driver device as claimed in claim 1, wherein the duty ratio of said first pulse signal is controlled to a first predetermined excitation current level during an overexcitation period, and to a second predetermined excitation current level during a hold period, within each period of said second pulse signal, said first predetermined excitation current level being higher than said second predetermined excitation current level.

4. A driver device for a duty solenoid valve which controls a fluid pressure by adjusting a duty ratio of an excitation of a solenoid coil, said driver device comprising:

first driver means for controlling a current level of an excitation current through said solenoid coil, in response to a duty ratio of a first pulse signal;

second driver means for turning on and off an excitation current flowing through said solenoid coil, in response to a second pulse signal having substantially longer period than said first pulse signal;

current detector means for detecting a level of the excitation current flowing through said solenoid coil;

first pulse width modulation signal generating means for generating, in response to the level of the excitation current detected by said current detector means, said first pulse signal having a duty ratio corresponding to a target excitation current level; and second pulse width modulation signal generating means for generating said second pulse signal having a duty ratio corresponding to a target fluid pressure of the duty solenoid valve;

wherein said first and second pulse width modulation signal generating means are comprised in a microcomputer; and wherein said first pulse width modulation signal generating means comprises:

a frequency division means for dividing a frequency of a clock pulse signal of said microcomputer;

a timer counter, coupled to said frequency division means, for counting a number of pulses supplied from said frequency division means, said timer counter returning to zero after each overflow;

a reference register for storing a reference value corresponding to the duty ratio of said first pulse signal;

a comparator for comparing a content of said timer counter with that of said reference register, said comparator outputting a first and a second logical level according to the content of the timer counter;

a timer control register for storing an output suppression flag bit, and bits for controlling a division factor of said frequency division means, wherein said suppression flag bit is set and cleared in response to a transition of a logical level of said second pulse signal generated by the second pulse width modulation signal generating means; and an output control circuit means, coupled to said comparator, for outputting an output of said comparator as said first pulse signal, said output control circuit means suppressing the output of said comparator in response to said suppression flag bit stored in said timer control register.

* * * * *